United States Patent

Shimizu et al.

[11] Patent Number: 5,520,887
[45] Date of Patent: May 28, 1996

[54] APPARATUS FOR GENERATING AND CONDENSING OZONE

[75] Inventors: Masami Shimizu, Yokohama; Katsuji Yamamoto, Tokyo; Muneo Ayabe, Kawagoe, all of Japan

[73] Assignee: Ishikawajima-Harima Heavy Industries Co., Ltd., Japan

[21] Appl. No.: 343,223

[22] Filed: Nov. 22, 1994

[30] Foreign Application Priority Data

Nov. 22, 1993 [JP] Japan ................................. 5-313959
Sep. 14, 1994 [JP] Japan ................................. 6-220491

[51] Int. Cl.$^6$ ................................................. B01J 19/00
[52] U.S. Cl. ........................... 422/186.08; 422/186.07; 422/186.11
[58] Field of Search .................. 422/186.07, 186.08, 422/186.11

[56] References Cited

U.S. PATENT DOCUMENTS

| 2,872,397 | 2/1959 | Kiffer | 204/176 |
|---|---|---|---|
| 3,663,418 | 5/1972 | Kawahata | 204/314 |
| 3,719,573 | 3/1973 | Kawahata | 204/176 |
| 3,963,625 | 6/1976 | Lowther | 250/533 |
| 4,084,098 | 4/1978 | Tabata et al. | 250/533 |
| 4,100,421 | 7/1978 | Tabata et al. | 250/533 |
| 4,136,027 | 1/1979 | Sakamoto et al. | 210/63 Z |
| 4,786,489 | 11/1988 | Grenier et al. | 423/581 |

*Primary Examiner*—Donald P. Walsh
*Assistant Examiner*—Daniel Jenkins
*Attorney, Agent, or Firm*—Thomas K. Ziegler

[57] ABSTRACT

The ozone generating and condensing system includes an oxygen generator for isolating oxygen from an air, an ozonizer provided downstream of the oxygen generator for generating ozone from the oxygen, two parallel-connected ozone absorption towers provided downstream of the ozonizer, an ozone absorption switching mechanism for allowing the ozone to flow into one of the absorption towers from the ozonizer and for recirculating to the ozonizer residual oxygen discharged from the one of the ozone absorption towers after an ozone absorption cycle therein, and an ozone release switching mechanism for introducing the nitrogen generated by the oxygen generator as a carrier gas to the one of the absorption towers after completion of ozone absorption cycle to release the absorbed ozone from the one of the ozone absorption towers and further for causing the released ozone to flow into a reactor tower located downstream of the absorption towers. A purge valve unit is incorporated in the system to purge the carrier gas toward the reaction tower from one of the absorption tower which completes its ozone releasing cycle prior to initiation of its ozone absorption cycle.

12 Claims, 6 Drawing Sheets

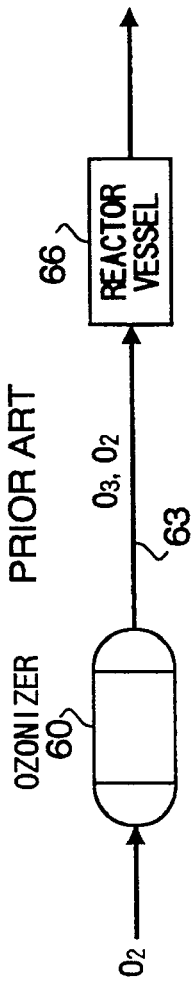
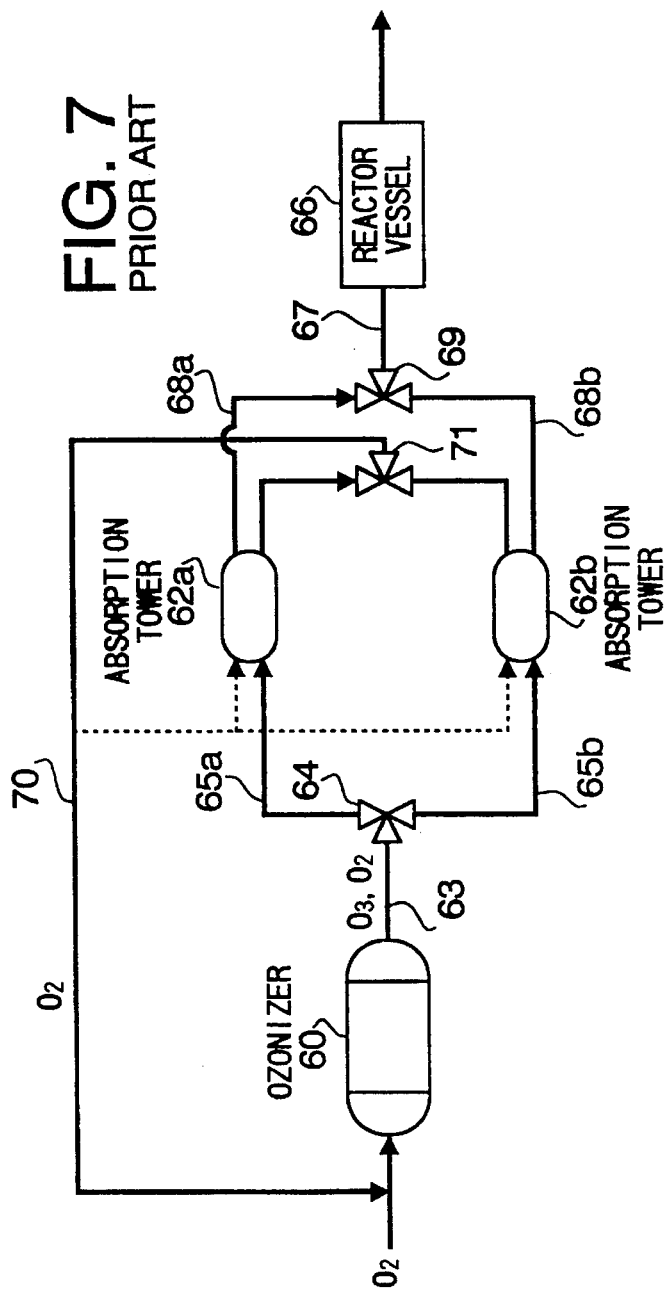

5,520,887

APPARATUS FOR GENERATING AND CONDENSING OZONE

BACKGROUND OF THE INVENTION

1. Technical Field

The present invention generally relates to an apparatus having an ozonizer, and more particularly to an apparatus for feeding ozone, which is generated by the ozonizer, to a processing unit to use the ozone as an oxidant or the like in the processing unit.

2. Background Art

Conventionally, pulp bleaching is usually carried out using chlorine or oxygen, and in recent years, it is occasionally conducted with ozone.

Use of ozone in pulp bleaching brings about the following advantages: unlike chlorine, it does not require a post-treatment after the bleaching and the bleaching process and/or operation is simpler. Further, better bleaching can be expected than oxygen.

However, a pulp bleaching system which employs ozone has a problem: an initial cost concerning generation of oxygen and ozone is high.

Various types of ozone generator are known in the art. For example, a static discharge type, a ultraviolet type and an electrolysis type are known. Among these, the static discharge type one is the most effective: it can industrially generate the largest amount of ozone. However, a resulting ozone concentration is about 10 vol % at most even if the static discharge type one is employed. Thus, a power efficiency is extremely low, which results in higher running cost.

One conventional ozonizer system is schematically illustrated in FIG. 6 of the accompanying drawings. As shown in FIG. 6, an ozonizer 60 is connected with a reaction vessel 66 in series directly by a feed pipe 63, and ozone $O_3$ produced in the ozonizer 60 is fed to the reaction vessel 66 together with oxygen $O_2$. In this system, however, ozone and oxygen exist together so that longevity of ozone is shortened and most of oxygen which is not converted to ozone is expelled to the atmosphere.

To eliminate the above problem, another type of system was developed (Japanese Patent Application, Publication Nos. 52-17385 and 52-35788). One example is schematically illustrated in FIG. 7 of the accompanying drawings. As illustrated, there are provided two absorption towers 62a and 62b which respectively fill up absorbents such as silica gel, and these absorption towers 62a and 62b are situated in parallel downstream of an ozonizer 60. An ozone/oxygen feed line 63 extending from the ozonizer 60 is branched to lines 65a and 65b at a branching point, and the absorption towers 62a and 62b are connected with downstream ends of the branch lines 65a and 65b respectively. The ozonizer 60 generates ozone from oxygen. A changeover valve 64 is provided at the branching point to selectively feed the exhaust gas (i.e., ozone) from the ozonizer 60 into the absorption towers 62a and 62b. Ozone feed pipes 68a and 68b extend from the absorption towers 62a and 62b to a reaction vessel 66. These pipes 68a and 68b meet a point upstream of the reaction vessel 66, at which another valve 69 is provided, so that a single flow of ozone enters the reaction vessel 66 through a pipe 67. Another pair of pipes extend from the absorption towers 62a and 62b to feed back oxygen to the ozonizer 60. These pipes are collected at a confluent point where a third valve 71 is located, and a single pipe 70 returns to the ozonizer 60 from the valve 71.

Upon manipulation of the switching valves 64 and 69, the ozone is introduced to the absorption tower 62a or 62b selectively (or alternatively) from the ozonizer 60 and absorbed and condensed by the absorbent in the absorption tower 62a or 62b selectively (or alternatively). Then, the condensed ozone is released from the absorbent and fed to the reaction vessel 66 from these absorption towers 62a and 62b selectively (or alternatively). Since two absorption towers 62a and 62b are installed, it is possible to continuously feed ozone to the reaction vessel 66. Specifically, alternatively operating the absorption towers 62a and 62b with the valves 64 and 69 results in uninterrupted ozone feeding. And, it is possible to feed ozone only to the reaction vessel 66 while recirculating oxygen to the ozonizer 60 as a raw material gas for the ozonizer 60. In this system, however, a carrier gas for separating or releasing ozone from the absorbent and conveying it to the reaction vessel 66 is necessary, and part of oxygen discharged from the absorption towers 62a and 62b and flowing in the recirculation pipe 70 is used as the carrier gas as indicated by the broken line. As a result, ozone condensed in the absorption towers 62a and 62b is diluted by oxygen before it reaches the reaction vessel 66. If ozone and oxygen exist together, a desired reaction cannot be expected in the reaction vessel 66.

To eliminate this problem, Japanese Patent Application, Laid-Open Publication No. 3-103304 discloses a system which uses an inert gas as a carrier gas. However, this system requires a separate inert gas feeding unit.

SUMMARY OF THE INVENTION

One object of the present invention is to provide an ozone generating and condensing apparatus which does not have a separate inert gas feeding unit but can feed ozone having a raised concentration and an extended longevity to a processing unit so as to effectively utilize the ozone in the processing unit.

Another object of the present invention is to provide an ozone generating and condensing apparatus which can further raise an ozone concentration.

According to one aspect of the present invention, there is provided an apparatus comprising an oxygen generator, an ozonizer provided downstream of the oxygen generator, an ozone condensing unit provided downstream of the ozonizer and having a plurality of ozone absorbing towers connected in parallel to each other, a reaction tower provided downstream of the ozone condensing unit, first ozone absorption switching means provided between the ozonizer and the ozone condensing unit for allowing ozone from the ozonizer to advance to a desired ozone absorbing tower, second ozone absorption switching means provided between the ozone condensing unit and the reaction tower for recirculating non-absorbed oxygen to the ozonizer, ozone separation switching means for allowing a discharged gas frown the oxygen generator (e.g., nitrogen gas: oxygen generator prepares oxygen by isolating oxygen from the air) to flow as a carrier gas into an absorbing tower which is holding the condensed ozone so as to separate ozone from an absorbent located in the absorbing tower and then feed the separated ozone into the reaction tower, and purging means for purging the carrier gas from the absorbing tower to the reaction tower when the ozone separation is switched to the ozone absorption. Since there are at least two absorbing towers, the first ozone absorption switching means selects an absorbing tower for the ozone absorption and the ozone separation switching means selects an absorbing tower for the ozone separation. Ozone flows into the selected absorbing tower from the ozonizer and it is condensed therein. To separate or release the condensed ozone from the absorbent and feed it to the reaction tower, the carrier gas (i.e., nitrogen gas) is introduced to the absorbing tower. After the ozone releasing and feeding to the reaction tower, ozone is introduced to the absorbing tower from the ozonizer to start the ozone absorbing cycle again. At this point, however, some carrier gas remains in the absorbing tower. Therefore, it is preferable to purge the carrier gas from the absorbing tower before the ozone is introduced to the absorbing tower. Otherwise, the carrier gas might flow back into the ozonizer by way of oxygen gas recirculation line. Regarding this, the purge means introduces residual oxygen from the ozonizer and/or residual oxygen from the absorbing tower which is carrying out the ozone absorption. As a result, the remaining carrier gas is forced into the reaction tower from the absorbing tower. Upon completion of this purging, the ozonizer feeds ozone into the absorbing tower.

Other aspects, objects and advantages of the present invention will become apparent from the following detailed description and the appended claims as read with the accompanying drawings.

BRIEF DESCRIPTION OF THE ACCOMPANYING DRAWINGS

FIG. 6 is a schematic diagram of a conventional ozone generating system; and

FIG. 7 is a schematic diagram illustrating another conventional ozone generating system.

DETAILED DESCRIPTION OF PREFERRED EMBODIMENTS

Now, preferred embodiments of the present invention will be described with reference to FIGS. 1 to 5 of the accompanying drawings.

Figure 1:
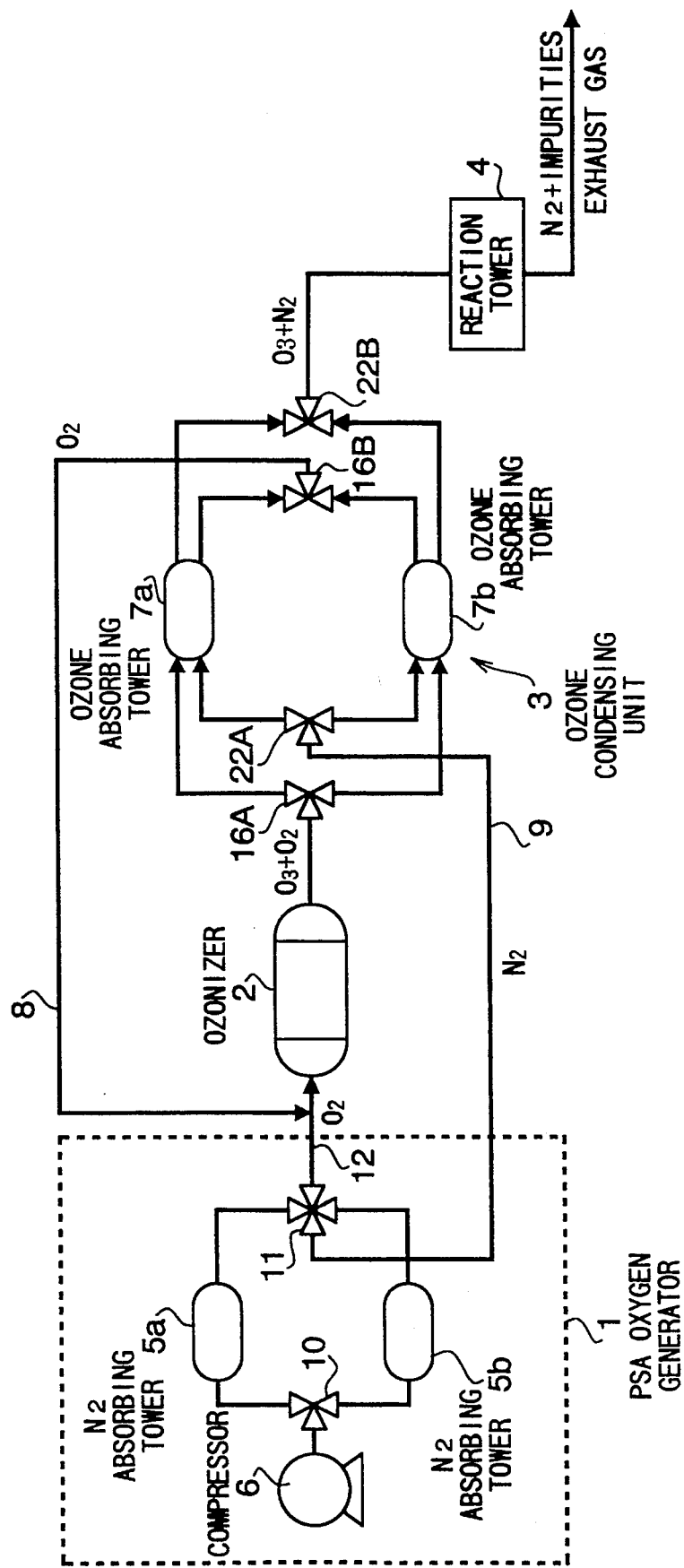
FIG. 1 is a schematic block diagram showing a first embodiment of an ozone generating and condensing apparatus according to the present invention.

Referring to FIG. 1, an ozone generating and condensing apparatus of this embodiment includes an oxygen generator 1 such as PSA (Pressure Swing Absorption) type one, an ozonizer 2 connected with an exit of the oxygen generator 1 for receiving oxygen from the oxygen generator 1 to generate ozone, an ozone condensing unit 3 connected with an exit of the ozonizer 2 and a reaction tower 4 connected with an exit of the ozone condensing unit 3. The PSA oxygen generator 1 includes a compressor 6, compressed air switching means 10 connected to an exit of the compressor 6, two nitrogen absorbing towers 5a and 5b connected with exits of the compressed air switching means 10 and a four-way valve 11 connected with exits of the nitrogen absorbing towers 5a and 5b. The nitrogen absorbing towers 5a and 5b are provided in parallel. Compressed air is fed to one of the nitrogen absorbing towers 5a or 5b from the compressor 6 upon manipulation of the compressed air switching means 10, and nitrogen is separated from the compressed air to produce oxygen $O_2$. Nitrogen is confined in the absorbing towers 5a or 5b. This oxygen $O_2$ is then fed to the ozonizer 2 through an oxygen line 12. The ozonizer 2 produces ozone from oxygen. Nitrogen $N_2$ absorbed by the absorbing towers 5a and 5b is isolated from the nitrogen absorbing towers 5a and 5b at an appropriate time and fed to the ozone condensing unit 3 by way of a carrier gas feed line 9 upon manipulation of the four-way valve 11. Nitrogen is used as a carrier gas (will be described later). The ozonizer 2 may have an insulated electrode to which a high voltage is applied. The ozonizer 2 also has a creeping discharge area and/or a silent discharge area formed around the insulated electrode to ozonize oxygen. Between the carrier gas line 9 and the ozone absorption towers 7a and 7b, provided is entrance-side absorption/release switching means 22A. The switching means 22A causes the carrier gas ($N_2$) from the carrier gas line 9 to enter one of the ozone absorption towers 7a or 7b such that the carrier gas takes ozone from the absorbents in the absorption towers 7a and 7b.

Entrance-side ozone absorption switching means 16A is provided downstream of the ozonizer 2 and an ozone condensing unit 3 is provided downstream of the entrance-side ozone absorption switching means 16A. The ozone condensing unit 3 includes at least two parallel ozone absorbing towers 7a and 7b. The entrance-side ozone absorption switching means 16A feeds the ozone to one of the ozone absorbing towers 7a or 7b. Exit-side ozone absorption switching means 16B is connected with exits of the ozone absorbing towers 7a and 7b for causing residual oxygen (i.e., oxygen not absorbed in the ozone absorbing tower 7a or 7b) to flow into a recirculation line 8 extending to the oxygen feed line 12. The entrance-side and exit-side ozone absorption switching means 16A and 16B constitute ozone absorption switching means 16. The ozone absorption switching means 16 selectively causes the ozone from the ozonizer 2 to enter one of the ozone absorbing towers 7a or 7b and causes non-absorbed oxygen in the absorbing tower 7a or 7b to flow back to the ozonizer 2 through the recirculation line 8.

On the exit side of the ozone absorption towers 7a and 7b, provided is exit-side ozone-release switching means 22B for selectively feeding the carrier gas to the reaction tower 4 together with the released ozone. The entrance-side and exit-side ozone-release switching means 22A and 22B are operated cooperatively such that they constitute in combination single ozone-release means 22.

As oxygen $O_2$ is introduced to the ozonizer 2, it is electrically dissociated or ionized to produce ozone $O_3$. The ozone $O_3$ is then introduced into the ozone condensing unit 3 from the ozonizer 2 together with oxygen $O_2$. An absorbent such as silica gel is placed in each of the absorbing towers 7a and 7b. Ozone $O_3$ and oxygen $O_2$ from the ozonizer 2 are fed to one of the ozone absorbing towers 7a or 7b, for example 7a, and only ozone $O_3$ is absorbed by the silica gel in the absorbing tower 7a to prepare condensed ozone. Oxygen $O_2$, not absorbed by the ozone absorbing tower 7a, is recirculated to the oxygen feed line 12 (and in turn to the ozonizer 2) from the ozone absorbing tower 7a by a recirculation line 8 and the ozone is condensed in the ozone absorbing tower 7a. In the meantime, nitrogen $N_2$ separated from the nitrogen absorbing towers 5a and/or 5b of the PSA oxygen generator 1 is introduced to the other ozone absorbing tower 7b by the carrier gas line 9. Assuming that condensed ozone is already made in the ozone absorbing tower 7b in the same manner as described above, the carrier gas $N_2$ takes the condensed ozone to the reaction tower 4.

The nitrogen absorbing towers 5a and 5b in the PSA oxygen generator 1 are operated alternatively so that oxygen $O_2$ is continuously fed to the ozonizer 2. Likewise, the ozone absorbing towers 7a and 7b in the ozone condensing unit 3 are operated alternatively so that the ozone absorption and removal take place alternatively in these ozone absorption towers 7a and 7b. This makes it possible to uninterruptedly feed the condensed ozone to the reaction tower 4.

In the ozone generating and condensing apparatus of the present invention, the maximum ozone concentration obtained from the ozonizer 2 itself is about 10 vol %. However, ozone is absorbed in the absorbing tower 7a (or 7b) and oxygen not absorbed in the absorbing tower 7a (or 7b) is fed back to the ozonizer 2. Thus, the ozone generating and condensing system can provide ozone having a higher concentration.

FIG. 1 shows a fundamental structure of the ozone generating and condensing apparatus according to the present invention. In the embodiment of FIG. 1, the ozone absorbed in the ozone absorbing tower 7a (or 7b) is isolated or removed or released by the carrier gas (i.e., nitrogen) and fed to the reaction tower 4. In this case, however, some carrier gas $N_2$ unavoidably remains in the absorbing tower 7a (or 7b) and it may be recirculated to the ozonizer 2 from the ozone absorbing tower 7a (or 7b) through the recirculation line 8 together with oxygen $O_2$ when the ozone removal and transfer operation is finished and another ozone absorption operation is initiated. As nitrogen $N_2$ enters the ozonizer 2. NOx is also generated by the ozonizer 2, and NOx is eventually introduced to the reaction tower 4. This is not preferred.

Figure 2:
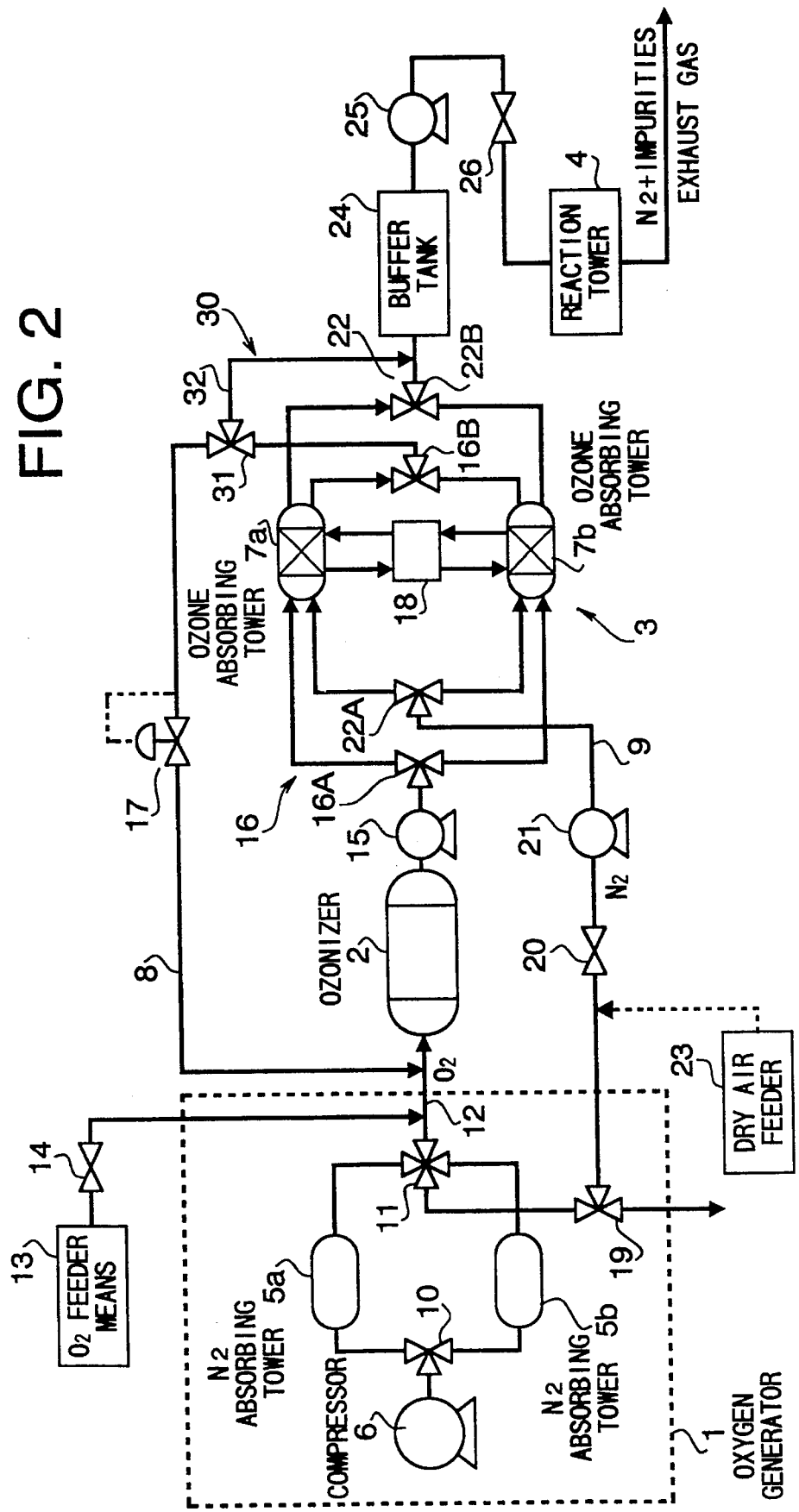
FIG. 2 illustrates a schematic block diagram of a second embodiment according to the present invention.

To eliminate this possible problem, it is preferred that the remaining nitrogen be taken away from the absorbing tower 7a (or 7b) prior to initiation of next ozone absorption cycle. FIG. 2 illustrates a modified system which eliminates the above-mentioned problem.

Parts of components 1–12, 16A, 16B, 22A and 22B of the embodiment of FIG. 2 are similar to those of the embodiment of FIG. 1 so that detailed description of these components is occasionally omitted here.

In FIG. 2, a PSA oxygen generator 1 includes a compressor 6, compressed air switching means 10 connected to an exit of the compressor 6, parallel nitrogen absorbing towers 5a and 5b connected to exits of the compressed air switching means 10 respectively, and a four-way valve 11 connected with exits of the nitrogen absorbing towers 5a and 5b. The compressed air switching means 10 selectively feeds the compressed air to one of the nitrogen absorbing towers 5a or 5b. The four-way valve 11 feeds oxygen to the ozonizer 2 from one of the nitrogen absorbing towers 5a and 5b which has already absorbed nitrogen and which is now releasing (or producing) oxygen. The four way valve 11 also causes nitrogen to flow into the carrier gas line 9 from the other nitrogen absorbing tower (5b or 5a) which has absorbed nitrogen and is now releasing nitrogen.

An oxygen feed line 12 extends from the four-way valve 11 to the ozonizer 2. Oxygen feed means 13 is connected with the oxygen feed line 12 and a valve 14 is provided between the oxygen feed means 13 and the oxygen feed line 12. The oxygen feeder 13 is operated till the oxygen generator 1 becomes a steady state. Specifically, during a start-up period of the oxygen generator 1, the oxygen generator 1 cannot provide sufficient oxygen to the ozonizer 2. Therefore, the oxygen feeder 13 complimentarily supplies oxygen to the ozonizer 2. The oxygen feeder 13 may include a liquid oxygen bomb or high pressure oxygen cylinder.

The ozonizer 2 has an insulated electrode to which a high voltage is applied and a creeping discharge area (or a silent discharge area) formed around the insulated electrode ozonize oxygen.

A pump 15 is provided downstream of the ozonizer 2, entrance-side ozone absorption switching means 16A is provided downstream of the pump 15 and an ozone condensing unit 3 Is provided downstream of the entrance-side ozone absorption switching means 16A. The ozone condensing unit 3 includes at least two parallel ozone absorbing towers 7a and 7b. The entrance-side ozone absorption switching means 16A feeds the ozone to one of the ozone absorbing towers 7a or 7b. Exit-side ozone absorption switching means 16B is connected with exits of the ozone absorbing towers 7a and 7b for causing residual oxygen ( i.e., oxygen not absorbed in the ozone absorbing tower 7a or 7b) to flow into a recirculation line 8 extending to the oxygen feed line 12. The entrance-side and exit-side ozone absorption switching means 16A and 16B constitute ozone absorption switching means 16. The ozone absorption switching means 16 selectively causes the ozone from the ozonizer 2 to enter one of the ozone absorbing towers 7a or 7b and causes non-absorbed oxygen in the absorbing tower 7a or 7b to flow back to the ozonizer 2 through the recirculation line 8.

A pressure regulator 17 is provided on the recirculation line 8 to maintain pressure in the ozone absorbing towers 7a and 7b within a predetermined range during the ozone absorbing process or cycle. A heat exchanger 18 is provided in the ozone condensing unit 3 to heat or cool the absorbing towers 7a and/or 7b, thereby to promote or facilitate the ozone absorption and removal (or separation) in the ozone absorbing towers 7a and 7b. The ozone absorption towers 7a and 7b are filled with an absorbent such as silica gel, respectively. During the ozone absorption, the ozone absorption towers 7a and 7b are cooled below a room or ambient temperature under pressure of about 8 $kg/cm^2$. During the ozone releasing, on the other hand, the ozone absorption towers 7a and 7b is heated over the ambient temperature and the inside pressure is considerably lowered from 8 $km/cm^2$.

An exhaust valve 19, an open/close valve 20 and a carrier gas pump 21 are provided oil the carrier gas line 9. The exhaust valve 19 allows part of nitrogen from the nitrogen absorption towers 5a and 5b to flow out of the system. Between the carrier gas line 9 and the ozone absorption towers 7a and 7b, provided is entrance-side ozone-release switching means 22A. The switching means 22A selects one of the ozone absorption tower 7a or 7b, in which absorption tower the ozone releasing is performed. Specifically, the entrance-side ozone-release switching means 22A causes the carrier gas from the carrier gas line 9 to enter one of the ozone absorption towers 7a and 7b such that the carrier gas takes ozone from the absorbent in the selected absorption tower.

Dried air feed means 23 is also connected with the carrier gas line 9 so that not only nitrogen but also dried air may be fed to the ozone absorption towers 7a and 7b as the carrier gas.

On the exit side of the ozone absorption towers 7a and 7b, provided is exit-side ozone-release switching means 22B for selectively feeding the carrier gas to the reaction tower 4 together with the released ozone. The entrance-side and exit-side ozone-release switching means 22A and 22B are operated cooperatively such that they constitute in combination ozone-release means 22.

A buffer tank 24, an ozone feed pump 25 and an open/close valve 26 are provided on a line extending to the reaction tower 4 from the exit-side switching means 22B.

The switching means 22 selects one of the ozone absorption tower 7a or 7b and the selected absorption tower performs the ozone release process. Upon completion of the ozone releasing cycle, purge means 80 performs a purging cycle before the ozone-absorption switching means 16 starts the ozone absorbing cycle.

The purge means 30 includes the entrance-side ozone-absorption means 16A, the exit-side ozone-absorption means 16B and a purge valve 31 connected with the recirculation line 8. The purge valve 31 usually admits free flow through the recirculation line 8. During a purge process or cycle, the purge valve 31 causes gases, which contain nitrogen, from the exit-side ozone absorption switching means 16B to flow into the buffer tank 24 by way of the purge line 32.

Now, operations of the embodiment will be described. The oxygen generator 1 feeds the dried compressed air from the compressor 6 to one of the $N_2$ absorption towers 5a or 5b through the compressed air switching means 10. In the selected $N_2$ absorption tower, nitrogen of the air is absorbed and oxygen is produced. Then, oxygen is introduced to the ozonizer 2 and flows through a creeping discharge area or zone or a silent discharge zone formed in the ozonizer 2 to become ozone. Ozone is introduced to the ozone condensing unit 3.

The entrance-side ozone-absorption switching means 16A feeds ozone, which is accompanied with oxygen, from the ozonizer 2 to one of the ozone absorption tower, for example, 7a. The exit-side ozone-absorption switching means 16B allows oxygen, which is not absorbed in the ozone absorption tower 7a, to flow into the recirculation line 8 and in turn to the ozonizer 2 by appropriately changing a passage of oxygen.

In short, ozone generated in the ozonizer 2 is absorbed by the absorption tower 7a whereas oxygen not absorbed in the absorption tower 7a is fed back to the ozonizer 2 by the recirculation line 8 so that the ozone concentration is raised as a whole.

During the ozone absorption cycle in the absorption tower 7a, the other absorption tower 7b receives, as the carrier gas, nitrogen which is released from one of the nitrogen absorption tower 5a or 5b. Nitrogen is introduced to the absorption tower 7b via the four-way valve 11 and the entrance-side ozone-release switching means 22A.

In the absorption tower 7b, ozone is absorbed and condensed. The condensed ozone is released by the carrier gas and fed to the buffer tank 24 by way of the exit-side ozone-release switching means 22B and in turn to the reaction tower 4.

The above-described ozone absorption and release cycles are performed alternately upon manipulation of the ozone-absorption switching means 16 and the release switching means 22. As a result, the ozone absorption and the ozone release are carried out alternately. Therefore, the condensed ozone is uninterruptedly available from one of the ozone absorption towers and it is possible to continuously feed the condensed ozone to the reaction tower 4.

In the embodiment, when the ozone release cycle is changed to the ozone absorption cycle, the purge means 30 causes nitrogen remaining in the absorption towers 7a and 7b to flow to the buffer tank 24, not to the recirculation line 8.

For example, If the ozone release cycle is completed in the absorption tower 7b, the purge cycle is started before or simultaneously as the ozone absorption cycle is initiated in the same absorption tower 7b. Specifically, the entrance-side ozone-absorption switching means 16A is manipulated to allow the ozone, which is accompanied with oxygen, from the ozonizer 2 to flow into the absorption tower 7b, which just finishes the ozone release cycle. Also, the exit-side ozone absorption switching means 16B is operated to cause gases in the absorption tower 7b to proceed into the recirculation line 8. Further, the purge valve 31 connected with the recirculation line 8 is operated such that gases containing nitrogen in the recirculation line 8 flow into the buffer tank 24 by way of the purge line 32.

On the other hand, the absorption tower 7a is switched to the ozone release cycle immediately after it finishes the ozone absorbing cycle.

Since the purge cycle is carried out between the ozone release cycle and the ozone absorption tower, nitrogen among the carrier gas remaining in the absorption tower 7a or 7b upon completion of the ozone releasing is not recirculated to the ozonizer 2 via the recirculation line 8. Therefore, presence of nitrogen in the system does not affect operations of the ozonizer 2 or does not produce Nox. Nitrogen is introduced to the reaction tower 4 during the purge cycle together with ozone.

After the purge cycle is completed or nitrogen is expelled from the absorption tower 7a or 7b, the purge valve 31 of the purge means 30 is switched to close the purge line 32 while allowing free flow throughout the circulation line 8. Then, initiated is the ozone absorption cycle, allowing the ozone absorption tower 7a or 7b to absorb ozone fed from the ozonizer 2.

In this ozone condensing system, an amount of oxygen prepared by the oxygen generator 1 may be insufficient during a start-up period of the system. Further, a generation rate of ozone produced by the ozonizer 2 may be also relatively low. Regarding this, an oxygen feeder 13 is connected with the oxygen feed line 12 such that additional oxygen is fed to the ozonizer 2 as required. Also, the exit-side ozone absorption switching means 16B may be directly closed or the valve 26 may be closed till the pressure in the circulation line 8 at a regulator 17 is raised to a predetermined value (e.g., 8 kg/cm$^2$). After the pressure at the regulator 17 reaches the predetermined value, the ozonizer 2 is initiated while the valve 16B or 26 is opened.

Figure 3:
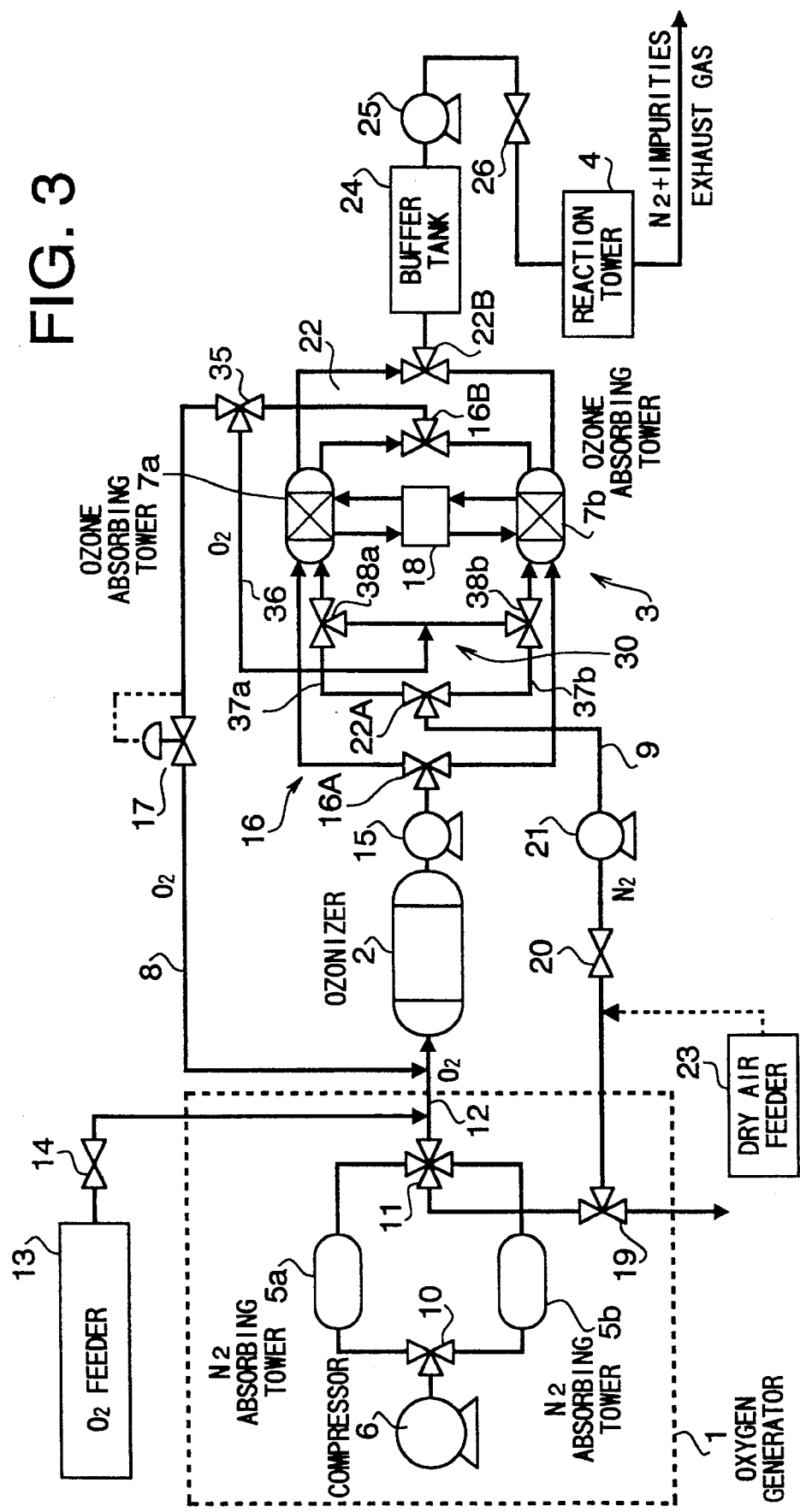
FIG. 3 illustrates a third embodiment of the present invention.

FIG. 3 illustrates a third embodiment according to the present invention. This embodiment includes a modified purge means 30.

In the FIG. 2 embodiment, the entrance-side ozone absorption switching means 16A and the exit-side ozone absorption switching means 16B are switched before the purge cycle starts, and then the purge valve 31 is manipulated so that the purge cycle is performed prior to the absorption cycle. In the FIG. 3 embodiment, on the other hand, the ozone release/absorption switching is not conducted immediately after completion of the ozone release cycle in the absorption tower 7b, for example. Specifically, the means 16A and 16B are maintained for a while after the completion of the ozone release cycle in the absorption tower 7b (or after the completion of the ozone absorption in the other absorption tower 7a), whereas the carrier gas feeding to the absorption tower 7b from the line 9 is stopped. In the meantime, the absorption tower 7a finishes the absorption cycle, with some oxygen existing in the absorption tower 7a and/or the circulation line 8. This oxygen is fed to the absorption tower 7b to purge nitrogen remaining in the absorption tower 7b. The oxygen may be fed to the absorption tower 7b at a final stage of the ozone absorption process in the other absorption tower 7a. At this final stage, the absorption tower 7b is already finishes the ozone releasing process.

As illustrated in FIG. 3, a main purge valve 35 is provided on the circulation line 8. This valve 35 allows oxygen from the absorption tower 7a, for example, to branch to the other absorption tower 7b during the ozone absorption cycle of the absorption tower 7a (or after the ozone release cycle of the other absorption tower 7b). An oxygen line 36 extends from the main purge valve 35 to secondary purge valves 38a and 38b which are provided on lines 37a and 37b respectively. The line 37a and 37b connect the entrance-side release switching means 22A with the absorption towers 7a and 7b respectively. When the ozone release cycle is finished in the absorption tower 7b, there is a carrier gas in the absorption tower 7b. To purge the carrier gas therefrom, oxygen from the absorption tower 7a, which is still in the ozone absorption cycle, is partially introduced to the absorption tower 7b by way of the main purge valve 35, the oxygen line 36 and the second purge valve 38b. The oxygen and the carrier gas including nitrogen are fed to the reaction tower 4 via the exit-side ozone release switching means 22B.

After the purge cycle, the entrance- and exit-side ozone absorption switching means 16A and 16B are switched so that the absorption tower 7b now undergoes the ozone absorption cycle and the other absorption tower 7a undergoes the release cycle.

According to this embodiment, the carrier gas remaining in the absorption tower, which just finishes the ozone release cycle, is taken out of the absorption tower by the residual oxygen from the other absorption tower and introduced into the reaction tower 4. Therefore, the carrier gas or nitrogen is not recirculated to the ozonizer 2. Upon completion of the purge cycle, ozone is fed to the absorption tower from the ozonizer 2 so that an appropriate ozone absorbing can be expected in the absorption tower.

Figure 4:
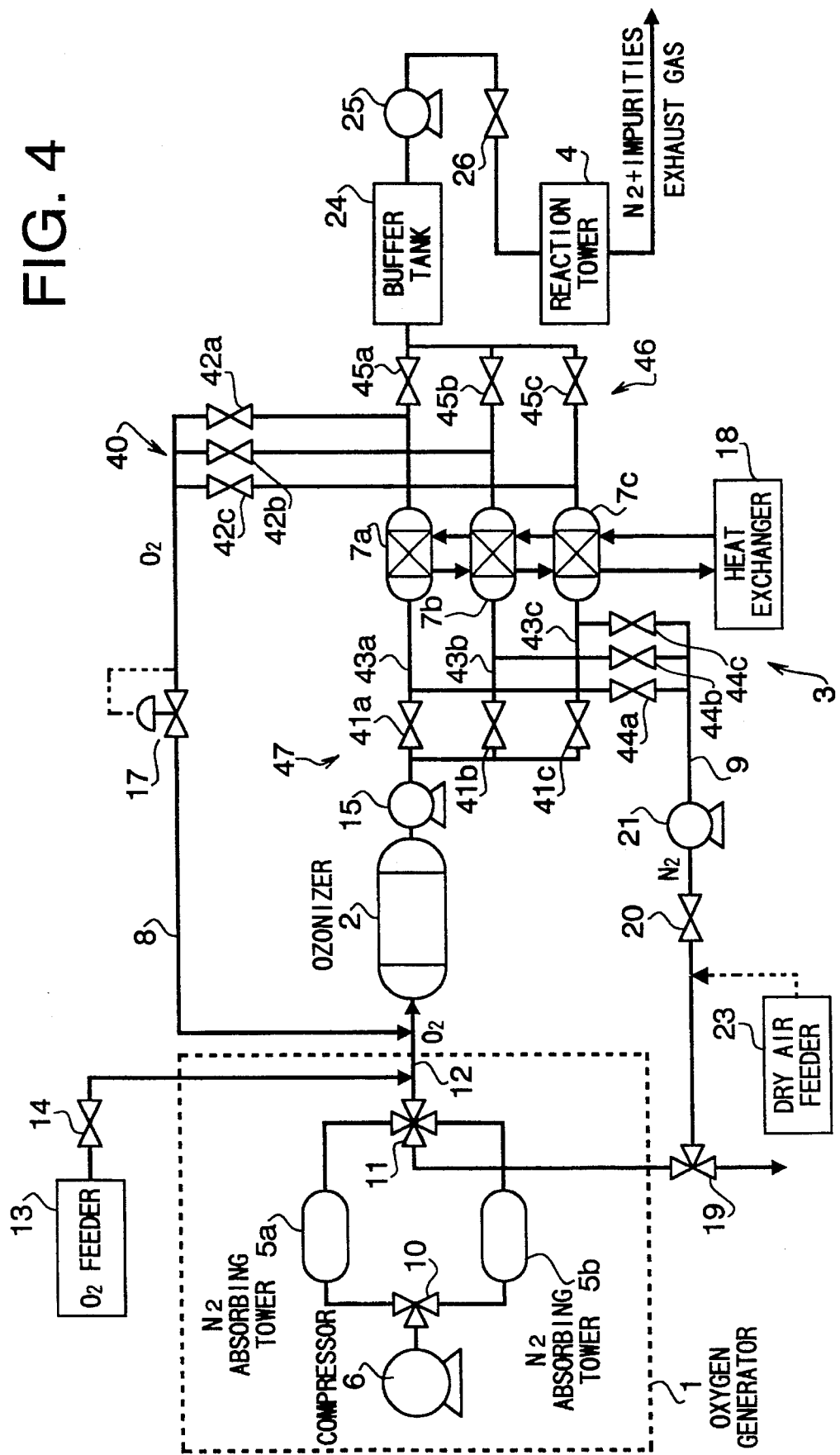
FIG. 4 illustrates a fourth embodiment according to the present invention.
Figure 5:
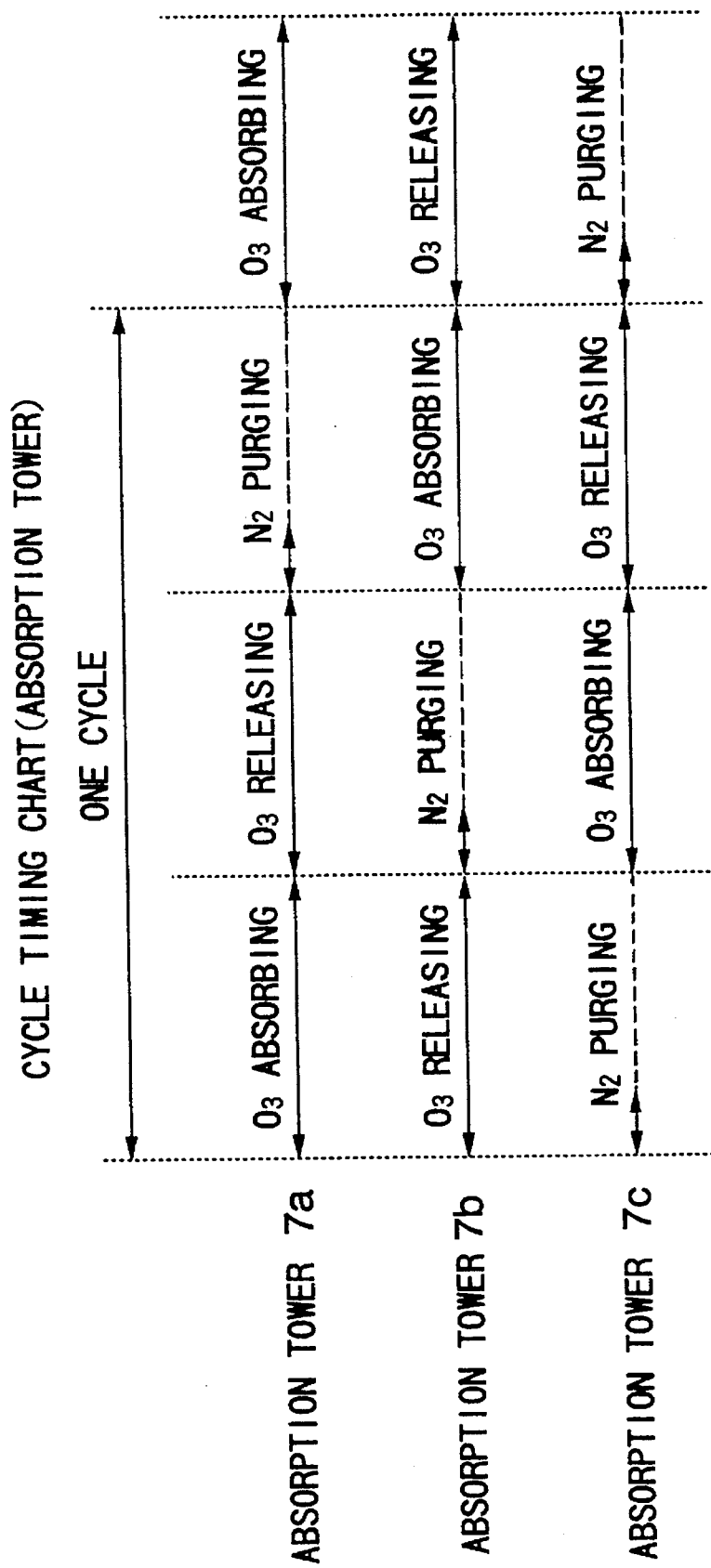
FIG. 5 shows timing charts of ozone absorbing, ozone releasing and purging cycles for three absorbing towers illustrated in FIG. 4.

Referring to FIG. 4, a fourth embodiment of the present invention is illustrated including three parallel absorption towers 7a, 7b and 7c. FIG. 5 shows release/absorption/purge timing charts for the respective absorption towers 7a–7c. Many parts of this system are mutual to the foregoing embodiments and assigned the same reference numerals so that description of these parts is occasionally omitted.

Entrance-side ozone absorption switching means 41a, 41b and 41c are provided upstream of the absorption towers 7a, 7b and 7c respectively. Three lines extend from exits of these absorption towers 7a–7c and are collected to a recirculation line 8. Before the confluence, exit-side ozone absorption switching means 42a, 42b and 42c are provided respectively. The entrance-and exit-side ozone absorption switching means constitute ozone absorption switching means 40.

A carrier gas line 9 are branched to three lines, and entrance-side ozone release switching means 44a, 44b and 44c are provided. These branch lines of the carrier gas line 9 extend to another three lines 43a, 43b and 43c spanning between the three entrance-side ozone absorption switching means 41a–41c and the three absorption towers 7a–7c, respectively. Exit-side ozone release switching means 45a, 45b and 45c are provided between the absorption towers 7a–7c and a buffer tank 24. The entrance- and exit-side ozone release switching means 44a–44c and 45a–45c form ozone release means 46. Purge means 47 is formed by the entrance-side ozone absorption switching means 41a–41c and the exit-side ozone release switching means 45a–45c.

Referring to FIG. 5, switching operations for the ozone absorption means 40, the ozone release means 46 and the purge means 47 in the absorption, release and purge cycles will be described.

Ozone absorption cycle

The entrance-side ozone absorption switching means 41a and the exit-side ozone absorption switching means 42a are in the communicated state, and the entrance-side ozone release means 44a and the exit-side ozone release means 45a are in the non-communicated state. The ozone from the ozonizer 2 is absorbed in the absorption tower 7a and the residual oxygen is expelled into the recirculation line 8 from the absorption tower 7a and returned to the ozonizer 2.

Ozone release cycle

The entrance-side ozone absorption switching means 41a and the exit-side ozone absorption switching means 42a are in the non-communicated state, and the entrance-side ozone release means 44a and the exit-side ozone release recalls 45a are in the communicated state. The carrier gas including nitrogen is introduced to the absorption tower 7a from the carrier gas line 9 via the entrance-side ozone release switching means 44a, and the ozone absorbed by an absorbent in the absorption tower 7a is freed from the absorbent and fed to the reaction tower 4 by way of the exit-side ozone release switching means 45a.

Nitrogen purge cycle

Before starting the ozone absorption cycle in the tower 7a after the ozone release cycle in the absorption tower 7a, the entrance-side ozone release switching means 44a is closed. (At the same time, the entrance-side ozone absorption switching means 41b and the exit-side ozone absorption means 42b of the absorption tower 7b are brought to a communicated state respectively to start the ozone absorption cycle immediately after the ozone release cycle in the absorption tower 7a.) Also simultaneously, the entrance-side ozone absorption means 41a of the absorption tower 7a is brought into a communicated state while the exit-side ozone absorption switching means 42a is brought to a non-communicated state. Further, the exit-side release switching means 45a is maintained to the communicated state and part of ozone from the ozonizer 2 is introduced to the absorption tower 7a so as to allow oxygen including ozone to purge the carrier gas including nitrogen from the absorption tower 7a toward the reaction tower 4. The purge cycle is only necessary for the purging of nitrogen from the absorption tower 7a. Therefore, the purge cycle may be performed in a shorter period as compared with the ozone absorption or release cycle, as illustrated in FIG. 5.

Even after the purge cycle of the absorption tower 7a, other absorption towers 7b and 7c are still in the ozone release or absorption process. Therefore, preferably the absorption tower 7a is stopped until a next ozone absorption cycle starts. Cooling the absorption tower 7a during this deactivated state is also preferable if the next absorption cycle is considered.

We claim:

1. An apparatus for generating and condensing ozone, comprising:

an oxygen generator for generating oxygen and nitrogen by separating oxygen from nitrogen, the oxygen generator having first and second parallel-connected nitrogen absorbing towers, each nitrogen absorbing tower being able to absorb nitrogen in air to isolate oxygen, the air being alternately fed to the first and second nitrogen absorbing towers, the isolated oxygen being released from one of the nitrogen absorbing towers which has absorbed nitrogen, and the absorbed nitrogen being released from the other absorbing tower;

an ozonizer provided downstream of the oxygen generator for receiving oxygen from the one of the nitrogen absorbing towers to generate ozone;

a plurality of ozone absorption towers provided downstream of the ozonizer for receiving ozone from the ozonizer, the ozone absorption towers being connected in parallel, each ozone absorption tower being able to absorb ozone;

ozone absorption switching means located upstream and downstream of the ozone absorption towers for allowing ozone to flow into a predetermined one of the ozone absorption towers from the ozonizer and for recirculating residual oxygen discharged from the one of the ozone absorption towers to the ozonizer;

ozone release switching means for introducing as a carrier gas the nitrogen released from the other nitrogen absorbing tower to the one of the absorption towers after completion of ozone absorption to release the absorbed ozone from the one of the ozone absorption towers and further for causing the released ozone to flow into a reactor tower located downstream of the absorption towers; and means for changing the role of the first and second nitrogen absorbing towers.

2. The apparatus of claim 1, wherein one nitrogen absorbing tower which finishes its nitrogen absorbing cycle has means to release nitrogen while the other nitrogen absorbing tower is absorbing nitrogen, and the ozone release switching means causes the released nitrogen as the carrier gas to flow into one of the ozone absorption towers.

3. The apparatus of claim 2, wherein the ozone absorption switching means allows ozone to flow into one of the ozone absorption towers from the ozonizer and causes ozone and oxygen remaining in the absorption tower after the ozone absorption to return to the ozonizer.

4. The apparatus of claim 1, further including an air compressor for alternately feeding compressed air to the nitrogen absorbing towers.

5. An apparatus for generating and condensing ozone, comprising:

an oxygen generator for generating oxygen and other gases;

an ozonizer provided downstream of the oxygen generator for generating ozone from oxygen;

a plurality of parallel-connected ozone absorption towers provided downstream of the ozonizer, each ozone absorbing tower absorbing ozone;

ozone absorption switching means located upstream and downstream of the ozone absorption towers for allowing ozone to flow into a desired one of the ozone absorption towers from the ozonizer and for recirculating to the ozonizer residual oxygen discharged from the one of the ozone absorption towers after an ozone absorption cycle therein, the ozone absorption switching means including entrance-side ozone absorption switching means located upstream of the ozone absorption towers for allowing ozone to flow into one of the ozone absorption towers from the ozonizer and exit-side ozone absorption means located downstream of the ozone absorption towers for causing the residual oxygen discharged from the ozone absorption towers to return to the ozonizer by way of an ozone recirculation line;

ozone release switching means for introducing as a carrier gas the other gases generated by the oxygen generator to the one of the absorption towers after completion of ozone absorption to release the absorbed ozone from the one of the ozone absorption towers and further for causing the released ozone to flow into a reactor tower located downstream of the absorption towers; and, purge means for purging the carrier gas toward the reaction tower from one of the absorption tower which completes its ozone releasing cycle prior to initiation of its ozone absorption cycle, the purge means using ozone and oxygen from the ozonizer to purge the carrier gas to the reaction tower from the ozone absorption tower which just finishes the ozone release cycle.

6. The apparatus of claim 5, wherein three ozone absorption towers are provided in parallel, each ozone absorption tower undergoes the ozone absorption cycle, the ozone release cycle and the carrier gas purge cycle.

7. The apparatus of claim 6, wherein the purge means causes part of the ozone generated in the ozonizer to flow into an ozone absorption tower which finishes the ozone release cycle.

8. The apparatus of claim 7, wherein the purge process is stopped when the carrier gas is purged from an absorption tower, and this absorption tower is switched to the ozone absorption cycle when another absorption tower enters the ozone release cycle.

9. An apparatus for generating and condensing ozone, comprising:

an oxygen generator for generating oxygen and other gases;

an ozonizer provided downstream of the oxygen generator for generating ozone from oxygen;

a plurality of parallel-connected ozone absorption towers provided downstream of the ozonizer, each ozone absorbing tower absorbing ozone;

ozone absorption switching means located upstream and downstream of the ozone absorption towers for allowing ozone to flow into a desired one of the ozone absorption towers from the ozonizer and for recirculating to the ozonizer residual oxygen discharged from the one of the ozone absorption towers after an ozone absorption cycle therein, the ozone absorption switching means including entrance-side ozone absorption switching means located upstream of the ozone absorption towers for allowing ozone to flow into one of the ozone absorption towers from the ozonizer and exit-side ozone absorption means located downstream of the ozone absorption towers for causing the residual oxygen discharged from the ozone absorption towers to return to the ozonizer by way of an ozone recirculation line;

ozone release switching means for introducing as a carrier gas the other gases generated by the oxygen generator to the one of the absorption towers after completion of ozone absorption to release the absorbed ozone from the one of the ozone absorption towers and further for causing the released ozone to flow into a reactor tower located downstream of the absorption towers; and, purge means for purging the carrier gas toward the reaction tower from one of the absorption tower which completes its ozone releasing cycle prior to initiation of its ozone absorption cycle, the purge means causing part of the residual oxygen, which is directed to the ozonizer from an absorption tower that is absorbing the ozone, to flow into another ozone absorption tower that finishes the ozone release cycle to purge the carrier gas therein to the reaction tower.

10. The apparatus of claim 9, wherein three ozone absorption towers are provided in parallel, each ozone absorption tower undergoes the ozone absorption cycle, the ozone release cycle and the carrier gas purge cycle.

11. The apparatus of claim 10, wherein the purge means causes part of the ozone generated in the ozonizer to flow into an ozone absorption tower which finishes the ozone release cycle.

12. The apparatus of claim 11, wherein the purge process is stopped when the carrier gas is purged from an absorption tower, and this absorption tower is switched to the ozone absorption cycle when another absorption tower enters the ozone release cycle.

* * * * *